US009674151B2

(12) United States Patent
Turner et al.

(10) Patent No.: US 9,674,151 B2
(45) Date of Patent: *Jun. 6, 2017

(54) REPACKAGING DEMOGRAPHIC DATA WITH ANONYMOUS IDENTIFIER

(71) Applicant: Apple Inc., Cupertino, CA (US)

(72) Inventors: William Bedford Turner, Campbell, CA (US); David P. Remahl, Berkeley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/150,692

(22) Filed: May 10, 2016

(65) Prior Publication Data
US 2016/0255053 A1 Sep. 1, 2016

Related U.S. Application Data

(63) Continuation of application No. 13/488,393, filed on Jun. 4, 2012, now Pat. No. 9,363,238.

(51) Int. Cl.
*G06F 15/16* (2006.01)
*H04L 29/06* (2006.01)
(Continued)

(52) U.S. Cl.
CPC ...... *H04L 63/0281* (2013.01); *G06F 21/6254* (2013.01); *G06F 21/6263* (2013.01);
(Continued)

(58) Field of Classification Search
CPC .............. G06Q 30/0271; H04L 67/306; H04L 63/0407; Y04S 50/14; G06F 21/6245; G06F 21/6263
(Continued)

(56) References Cited

U.S. PATENT DOCUMENTS 6,128,663 A * 10/2000 Thomas ............. G06Q 30/02
709/217
6,308,203 B1 * 10/2001 Itabashi ........... G06F 17/30867
707/999.01

(Continued)

FOREIGN PATENT DOCUMENTS

EP 2341479 7/2011
WO 2009087613 7/2009

OTHER PUBLICATIONS

International Search Report and Written Opinion from PCT Application No. PCT/US2013/041890 dated Oct. 9, 2013.

(Continued)

*Primary Examiner* — Joseph E Avellino
*Assistant Examiner* — Binod J Kunwar
(74) *Attorney, Agent, or Firm* — Polsinelli LLP

(57) ABSTRACT

Using uniquely generated identifiers in a network-based ecosystem in which a plurality of client devices request media content and software applications from online distribution system and additionally request invitational content from invitational content providers. Separating users' demographic data from a device-specific identifier in favor of uniquely generated identifiers and using the client device to enforce the substation of uniquely generated identifiers in favor of a device identifier, thereby using the client device to serve as a proxy in creating a firewall to exclude system partners from access to a device identifier.

20 Claims, 6 Drawing Sheets

(51) Int. Cl.
*H04L 29/08* (2006.01)
*G06Q 30/02* (2012.01)
*G06F 21/62* (2013.01)

(52) U.S. Cl.
CPC ..... *G06Q 30/0271* (2013.01); *H04L 63/0421* (2013.01); *H04L 67/306* (2013.01); *Y04S 50/14* (2013.01)

(58) Field of Classification Search
USPC .......................................................... 709/217
See application file for complete search history.

(56) References Cited

U.S. PATENT DOCUMENTS

| | | | |
|---|---|---|---|
| 7,225,460 B2 | 5/2007 | Barzilai et al. | |
| 7,293,294 B2 | 11/2007 | Ukai | |
| 7,551,913 B1 | 6/2009 | Chien | |
| 7,630,986 B1 | 12/2009 | Herz et al. | |
| 7,788,271 B2 | 8/2010 | Soma | |
| 7,913,291 B2 | 3/2011 | Yeung et al. | |
| 8,086,487 B2 | 12/2011 | Bistriceanu et al. | |
| 8,254,892 B2 | 8/2012 | Chien | |
| 8,307,006 B2* | 11/2012 | Hannan | G06Q 30/02 707/706 |
| 8,364,969 B2 | 1/2013 | King | |
| 8,369,834 B2 | 2/2013 | Rozensztejn | |
| 8,387,108 B1 | 2/2013 | Satish et al. | |
| 8,504,411 B1* | 8/2013 | Subasic | G06Q 30/0201 705/14.41 |
| 8,516,550 B2 | 8/2013 | Willars | |
| 8,521,594 B1 | 8/2013 | Skoe | |
| 8,577,806 B2 | 11/2013 | Kuehr-McLaren et al. | |
| 8,627,403 B1 | 1/2014 | Kirshenbaum et al. | |
| 8,775,391 B2 | 7/2014 | Kalavade | |
| 2002/0059387 A1* | 5/2002 | Wolfe | G06Q 30/02 709/206 |
| 2002/0099824 A1* | 7/2002 | Bender | G06F 21/6254 709/225 |
| 2005/0102155 A1 | 5/2005 | Kuehr-McLaren | |
| 2006/0026067 A1 | 2/2006 | Nicholas | |
| 2008/0123843 A1 | 5/2008 | Machani | |
| 2009/0070412 A1* | 3/2009 | D'Angelo | G06Q 10/10 709/203 |
| 2009/0129377 A1 | 5/2009 | Chamberlain | |
| 2010/0199089 A1 | 8/2010 | Vysogorets | |
| 2010/0228617 A1 | 9/2010 | Ransom et al. | |
| 2010/0229224 A1 | 9/2010 | Etchegoyen | |
| 2011/0060649 A1 | 3/2011 | Dunk | |
| 2011/0106610 A1* | 5/2011 | Landis | G06Q 30/02 705/14.39 |
| 2012/0041792 A1 | 2/2012 | Priyadarshan | |
| 2012/0066757 A1 | 3/2012 | Vysogorets | |
| 2012/0102008 A1* | 4/2012 | Kaariainen | G06Q 30/0201 707/705 |
| 2012/0254320 A1 | 10/2012 | Dove | |
| 2012/0254949 A1 | 10/2012 | Mikkonen | |
| 2012/0271860 A1 | 10/2012 | Graham et al. | |
| 2013/0054628 A1* | 2/2013 | Meierhoefer | G06F 17/30 707/758 |
| 2013/0124309 A1 | 5/2013 | Traasdahl et al. | |
| 2013/0138506 A1* | 5/2013 | Zhu | G06Q 30/0251 705/14.53 |
| 2013/0238745 A1* | 9/2013 | Ramachandran | H04N 21/2396 709/217 |
| 2013/0297422 A1 | 11/2013 | Hunter et al. | |
| 2013/0326007 A1 | 12/2013 | Turner | |
| 2014/0215635 A1* | 7/2014 | Neuenschwander | G06F 21/6254 726/26 |

OTHER PUBLICATIONS

International Preliminary Report on Patentability from PCT Application No. PCT/US2013/041890 dated Dec. 18, 2014.
Manuel Egele et al., "PiOS: Detecting Privacy Leaks in iOS Applications", NDSS, Jan. 1, 2011 (Jan. 1, 2011), XP055082035, Retrieved from the Internet: URL:http:ftwww.syssec-project.eu/m/page-media/3/egele-ndss11.pdf retrieved on Oct. 1, 2013.
Alex Heath, "What is a UDID and Why Is Apple Killing Apps That Track Them?", May 20, 2012 (May 20, 2012), XP055082187, Retrieved from the Internet: URL: http://web.archive.org/web/20120520141536/http://www.cultofmac.com/160248/what-the-hell-is-a-udid-and-why-is-apple-worries-about-them-feature/2/, [retrieved on Oct. 2, 2013].
Alex Heath, "What is a UDID and Why Is Apple Killing Apps That Track Them?", Apr. 19, 2012, pp. X-X, URL: http://web.archive.org/web/20120419015440/http://www.cultofmac.com/160248/what-the-hell-is-a-udid-and-why-is-apple-worried-about-them-feature/, [retrieved on Oct. 2, 2013].

\* cited by examiner

REPACKAGING DEMOGRAPHIC DATA WITH ANONYMOUS IDENTIFIER

CROSS REFERENCE TO RELATED APPLICATIONS

This application is a continuation of, and claims the benefit of priority to, U.S. application Ser. No. 13/488,393, filed on Jun. 4, 2012, which is expressly incorporated by reference herein in its entirety.

BACKGROUND

Technical Field

The present technology relates generally to user privacy in a network-based ecosystem and more specifically to client devices creating a firewall between a client device and an invitational content provider across which personal user data does not cross.

Introduction

Online commerce is quickly becoming a ubiquitous part of the modern economy and there are many options for finding and buying goods and services online. Along the lines of this growth have been increased concerns for privacy and online anonymity. Like the more traditional markets, the online retail market benefits greatly from invitational content. Moreover, a much greater benefit is derived in an invitational media campaign when invitational content can be targeted to certain users who are more likely to be interested in the invitational content. Therefore, it is beneficial to pass some information about users to an invitational content provider in order allow the invitational content provider to target users. However, the practice of providing personal data that can serve to identify particular users apart from their simple demographic attributes is oftentimes socially, politically, and possibly legally unacceptable.

Online retailers have provided demographic information to invitational content providers along with an identifier that linked the demographic information to a particular user. Also, the same identifier was used by third party developers to track the users of their software. Therefore, in a robust distribution system having many partners and having users who are very active in the ecosystem, the users' data was widely spread out through the whole system. In fact, as the amount of transactions grow, the amount of personal data that is associated with the identifier can also grow to a point where it is conceivable that the system could piece together the small amounts of personal data using the identifier and compile a relatively complete picture of who the user might be.

Accordingly, the present technology addresses the need to separate demographic information from an identifier and simply provide partners with segmented demographic information along with an anonymous identifier.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by practice of the principles set forth herein.

In view of the concerns now recognized and stated above, some embodiments of the present technology avoid disclosing the same user identifier to any two providers of services to a device. In some embodiments a user device can generate and assign a different identifier for each service provider. Some embodiments of the present technology involve using the client device to enforce the use of uniquely generated identifiers in place of the use of a device identifier, thereby serving as a proxy in creating a firewall to exclude system partners from access to a device identifier.

In some embodiments of the present technology, the uniquely generated identifier can be used by the service provider to uniquely and unambiguously identify a user device to the service provider which allows the service provider to collect data that is deemed necessary or desirable for the performing on the service. The service provider is expected to treat this information according to an accepted privacy policy and with the full knowledge of the user. Since the identifier is unique, the identifier has no meaning outside of that service. Further, since the identifier is not associated with any other user identifying information there is no mechanism to learn of the identity of the user without having actual possession of the device that generated the unique identifier.

In some embodiments of the present technology, a system for providing uniquely generated identifiers is configured to operate on a computing device that can download applications from an online store for the purposes of receiving services from those applications. In such embodiments the online store may have knowledge of user identifying data and payment information, but this information is never shared with any application other than the online store itself. According to these embodiments, each application downloaded from the online store can be considered a service provider, whether the application is a game, an Internet connected application, a productivity tool, etc. Regardless of the nature of the service, if a service requests a unique identifier, the computing device can share an identifier uniquely created for that service. The device can reissue the same identifier to the same service whenever the identifier is subsequently requested. In this way the service can uniquely identify the computing device requesting the service.

In some embodiments, services may come preinstalled on a client device. Even in such embodiments wherein the user does not install the service onto their client device the mechanism by which an identifier is created and assigned is the same as for applications downloaded from the online store.

In some embodiments, a service can request additional information beyond just an identifier. For example, a service might request demographic information. If the computing device deems sharing of such information appropriate selected information can be shared along with the identifier. In many instances sharing of such information will require the user's explicit consent.

In some embodiments of the present technology it is acknowledged that previous systems share the same identifier, often a device ID with all service providers, and as such services using the previous system will benefit from being transitioned to a system utilizing the present technology. In such instances, it can be desirable to send both the old identifier and the new identifier to the service provider just once for the purposes of transitioning to the new identifier issued according to the present technology. However, such transitioning option can only be offered to highly trusted service providers because providing the old ubiquitous ID along with the new unique ID could be used to circumvent the present technology if the old ubiquitous ID were not discarded.

Some methods involve enforcing additional content restrictions, ensuring compliance with requests to opt out of the use of demographic data, and bot detection using the uniquely generated identifiers.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for ensuring that user demographic data sent from a client device does not contain a personal identifier and for ensuring that a user who has opted of receiving invitational content that uses demographic data to target what invitational content is served to the user does not receive such served content.

Figure 1:
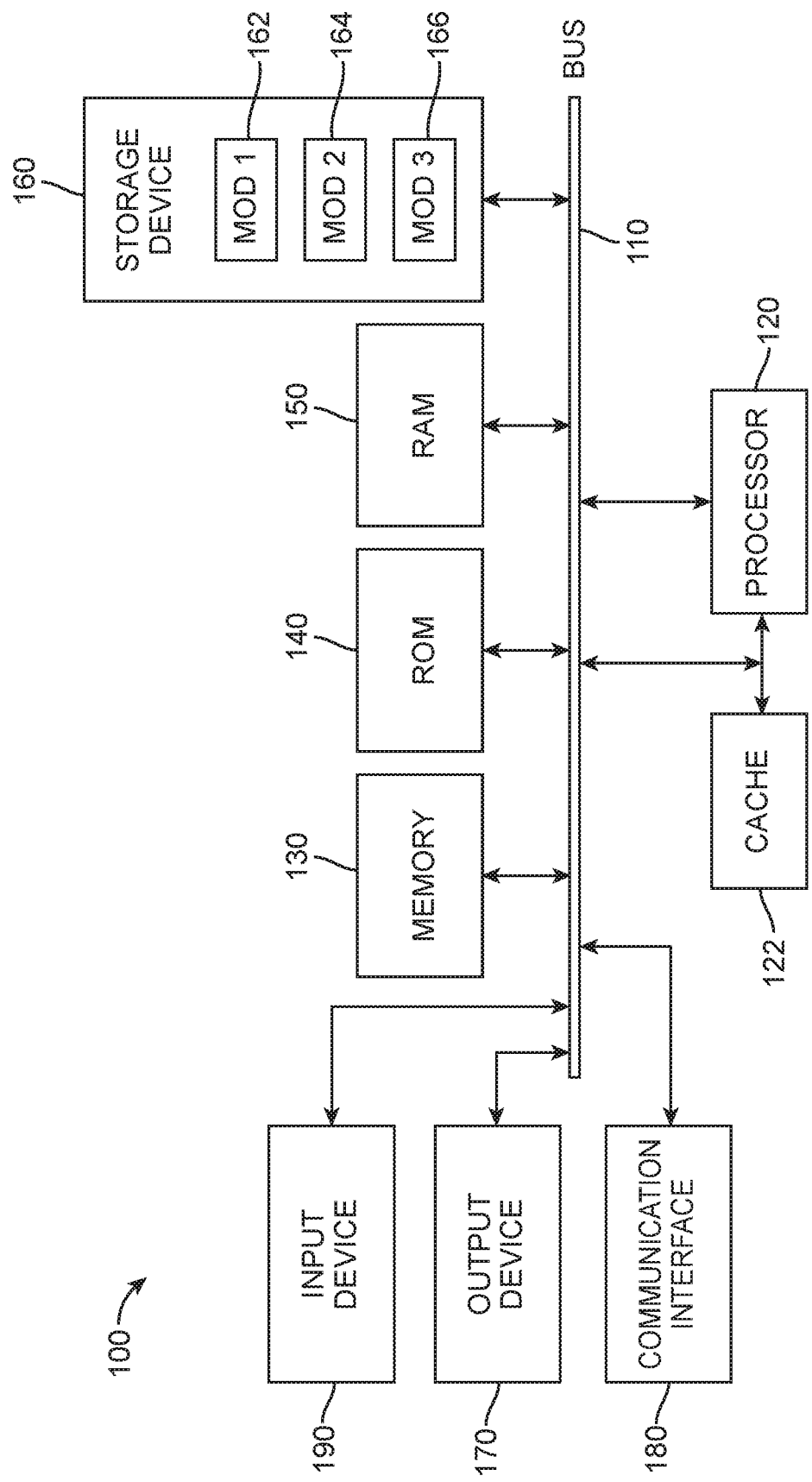
FIG. 1 illustrates an exemplary computer system according to some embodiments of the present technology.

Various embodiments of the present technology are carried out using one or more computing device. With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166, which are modules configured to control the processor 120. These modules may be stored on the storage device 160 and loaded into RAM 150 or memory 130 at runtime or may be stored as would be known in the art in other computer-readable memory locations.

Figure 2:
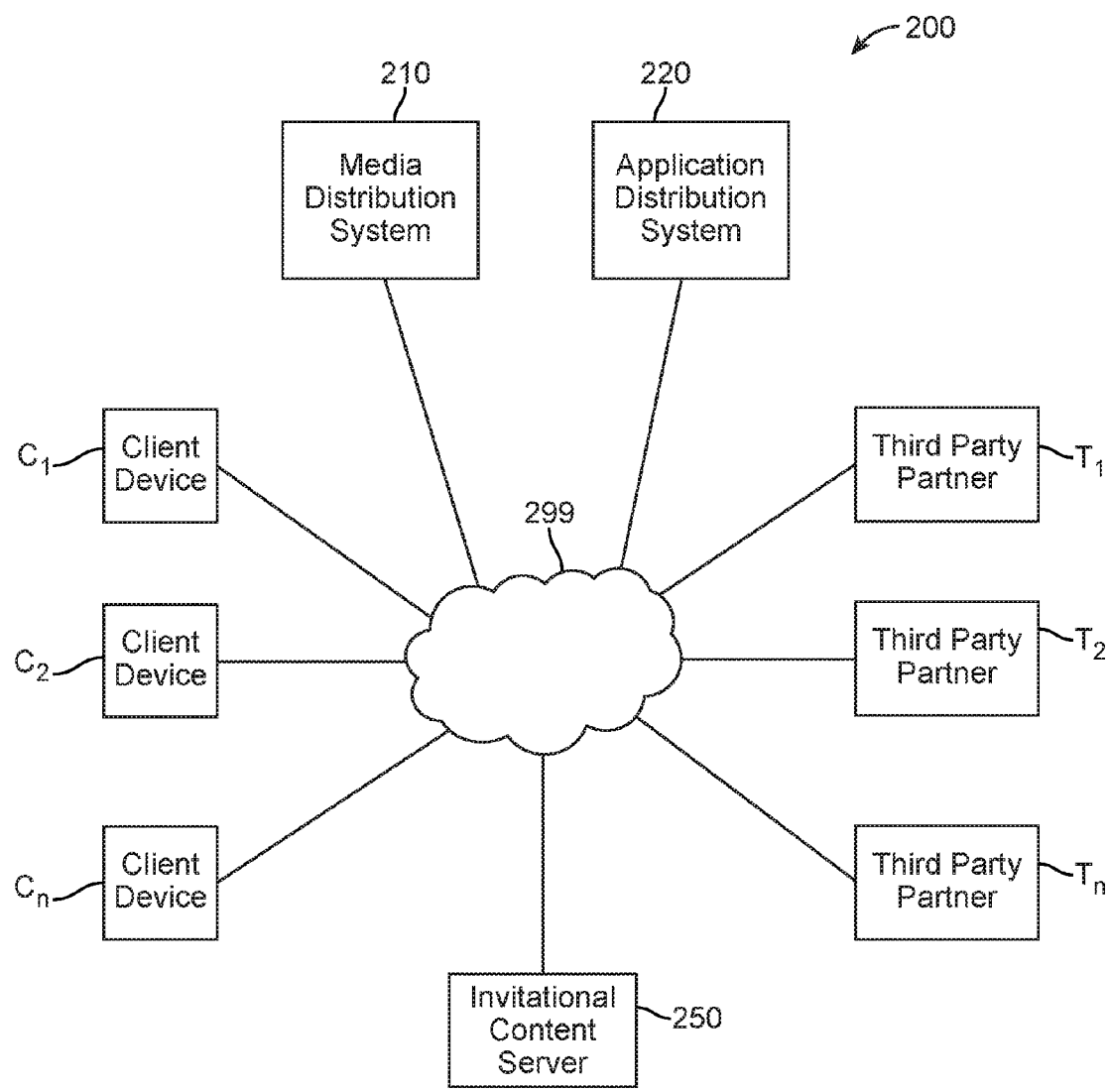
FIG. 2 illustrates an exemplary network infrastructure 200 according to some embodiments of the present technology.

The present technology is carried out in a network-based ecosystem in which pluralities of computer devices communicate with each other via one or more networks. FIG. 2 illustrates an exemplary network infrastructure 200 according to some embodiments of the present technology.

According to FIG. 2, the network infrastructure 200 comprises a plurality of client devices C1, C2, . . . , Cn operatively coupled with a media distribution system 210, an application distribution system 220, or both via one or more networks 299.

In some embodiments of the present technology, the media distribution system 210 and the application distribution system 220 allow users to create accounts for storing profile information, contact information, billing information, media items, taste data, etc. In some embodiments of the present technology, the media distribution system 210 comprises an online store for selling or otherwise providing media items such as iTunes®, available from Apple Inc. of Cupertino, Calif. In some embodiments of the present technology, the application distribution system 220 comprises an online store for selling or otherwise providing software applications items such as the AppStore™, available from Apple Inc. of Cupertino, Calif.

The media distribution system 210 and the application distribution system 220 are also operatively coupled with third party partners T1, T2, . . . , Tn. The third party partners T1, T2, . . . , Tn provide media and software applications and services in addition to or in connection with the services provided by the media distribution system 210 and the application distribution system 220.

Additionally, the plurality of client devices C1, C2, . . . , Cn are operatively coupled with an invitational content server 250. The invitational content server 250 is configured to target, package, and deliver invitational content to users. As explained above, the invitational content server 250 oftentimes targets invitational content to users based on demographic information relating to the users.

The media distribution system 210 and the application distribution system 220 each store demographic information about users that can be extremely useful to invitational content providers when choosing what content to provide to users. However, as explained above, it is beneficial to separate the demographic information from an identifier. Accordingly, some embodiments of the present technology involve a method of separating users' demographic data from a device-specific identifier.

As described herein, one aspect of the present technology is the gathering and use of data available from various sources to improve the delivery of invitational content including, promotions, advertisements, or any other content that may be of interest to users. The present disclosure contemplates that, in some instances, this gathered data may include personal information data that uniquely identifies or can be used to contact or locate a specific person. Such personal information data can include demographic data, location-based data, telephone numbers, email addresses, twitter ID's, home addresses, or any other identifying information.

The present disclosure recognizes that the use of such personal information data in the present technology can be used to the benefit of users. For example, the personal information data can be used to better understand user behavior, facilitate and measure the effectiveness of advertisements, applications, and delivered content. Accordingly, use of such personal information data enables calculated control of the delivered content. For example, the system can reduce the number of times a user receives a given ad or other content and can thereby select and deliver content that is more meaningful to users. Such changes in system behavior improve the user experience. Further, other uses for personal information data that benefit the user are also contemplated by the present disclosure.

The present disclosure further contemplates that the entities responsible for the collection, analysis, disclosure, transfer, storage, or other use of such personal information data should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after the informed consent of the users. Additionally, such entities would take any needed steps for safeguarding and securing access to such personal information data and ensuring that others with access to the personal information data adhere to their privacy and security policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for advertisement delivery services. In yet another example, users can configure their devices or user terminals to prevent storage or use of cookies and other mechanisms from which personal information data can be discerned. The present disclosure also contemplates that other methods or technologies may exist for blocking access to their personal information data.

Figure 3:
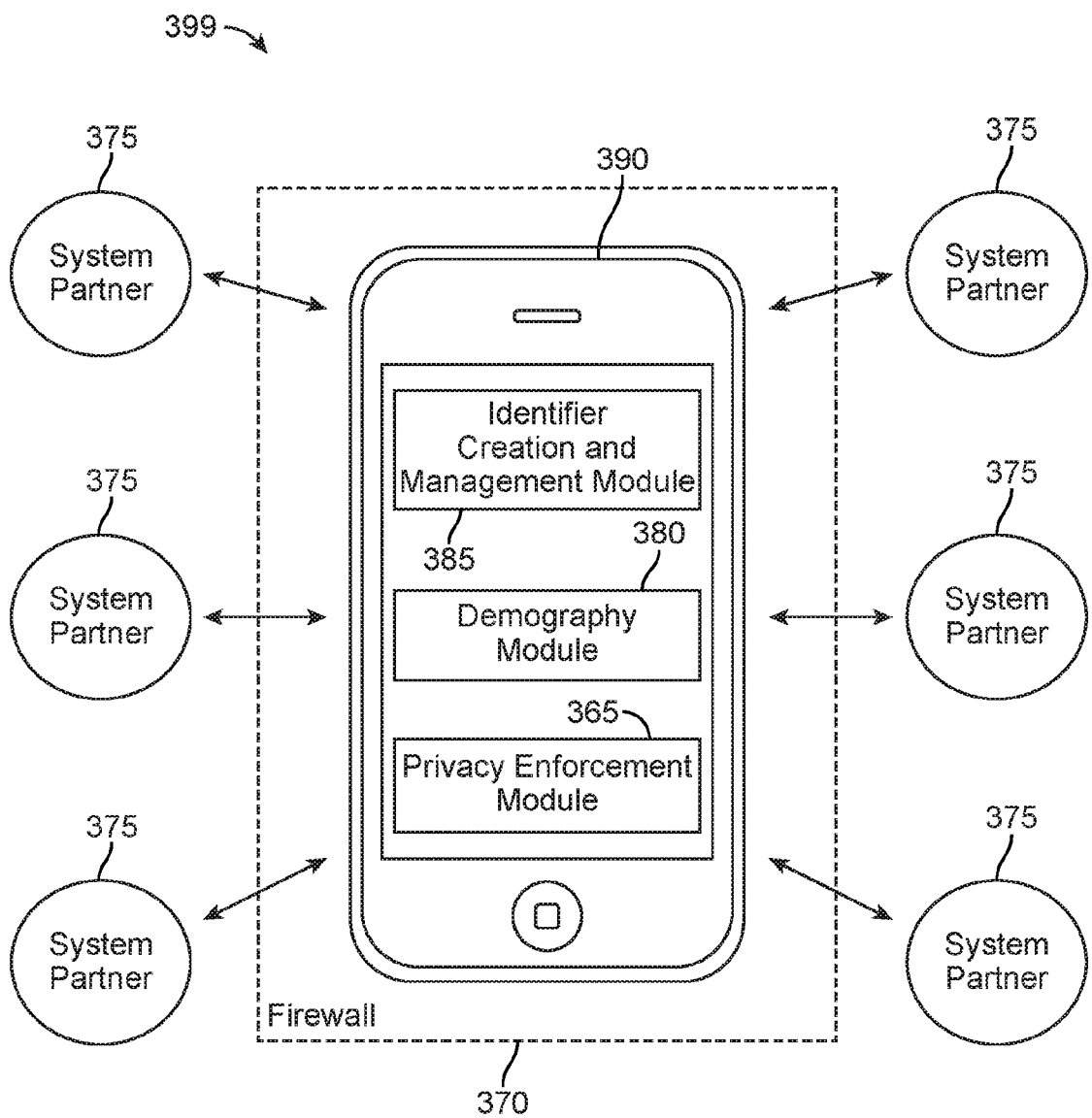
FIG. 3 illustrates an exemplary system for device-based information management in an ecosystem having a plurality of system partners according to some embodiments of the present technology.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information. As explained above, in some online ecosystems, a system operator could conceivably piece together the small amounts of personal data dispersed throughout a system to compile a relatively complete picture of who the user might be. Accordingly, some embodiments of the present technology involve managing the information shared with system partners using unique identifiers that do not contain information that can be pieced together to identify the user of a device or even to make an educated guess about the identity of the user. FIG. 3 illustrates an exemplary system 399 for device-based information management in an ecosystem having a plurality of system partners 375 according to some embodiments of the present technology.

As shown in FIG. 3, a client device 390 is operatively coupled, through one or more networks, to a plurality of system partners 375. System partners 375 can comprise a number of different entities including online service providers, software applications, preinstalled device programs, software add-ons, media content distribution servers, application distribution servers, etc. The client device 390 includes an identifier creation and management module 385 configured for generating unique identifiers, assigning the uniquely generated identifiers to system partners, and managing interactions with the system partners using the uniquely generated identifiers.

In some embodiments of the present technology, the identifier creation and management module 385 of the client device 390 generates unique identifiers on-demand as a new system partner 375 is configured. For example, in the case of a software application as a system partner 375, when a user installs a new software application on his mobile device, the identifier creation and management module 385 generates a unique identifier and provides the new software application with the uniquely generated identifier. The identifier creation and management module 385 keeps track of the identifier and the software application it is assigned to. Likewise, the software application associates the identifier with a particular device. Accordingly, the software application can track the interaction between the user of the device and the software application and vice versa.

According to these embodiments, the system partners can keep track of a particular device, but not gain any information about the identity of the user of that device. Consequently, the identifier creation and management module 385 acts as a proxy in creating a firewall 370 around the device over which user-identifying information does not cross.

In some embodiments of the present technology, the system 399 includes a demography module 380 configured for deriving information about a user through interaction with the system partners 375. In some embodiments of the present technology, and in accordance with the privacy policy explained above, the demography module 380 can record explicit demographic information gained through interaction with system partners 375. For example, if a user creates a public profile with a particular system partner 375, the partner can share information with the demography module 380 such as address, age, gender, etc. Likewise, in some embodiments of the present technology, and in accordance with the private policy stated above, the demography module 380 can imply demographic information. For example, the demography module 380 can imply that a user who subscribes to a system partner's online magazine that relates to high-end automobiles belongs in a higher income bracket. However, no matter how the demography module 380 extracts demographic information from system partners 375, the other system partners 375 will not be able to access it because they are separated by the firewall 370.

In some embodiments of the present technology, the client device 390 also includes a privacy enforcement module 365. In some embodiments, the privacy enforcement module 365 is configured for ensuring compliance with the privacy policy disclosed above. In some embodiments, the privacy enforcement module 365 is configured for sharing information extracted from system partners 375. In some embodiments, the system 399 determines what information to share with a first system partner 375 and what different information to share with a second system partner 375. For example, a system partner 375 might request demographic information from the client device. If the privacy enforcement module 365 deems sharing of such information appropriate, selected information can be shared along with the identifier. In many instances sharing of such information will require the user's explicit consent. In some embodiments of the present technology, the system 399 includes one or more trusted system partners 375'. In accordance with the above-mentioned privacy policy, the identifier creation and management module 385 can be configured to share different information with an ordinary system partner 375 than with a trusted system partner 375'.

Figure 4:
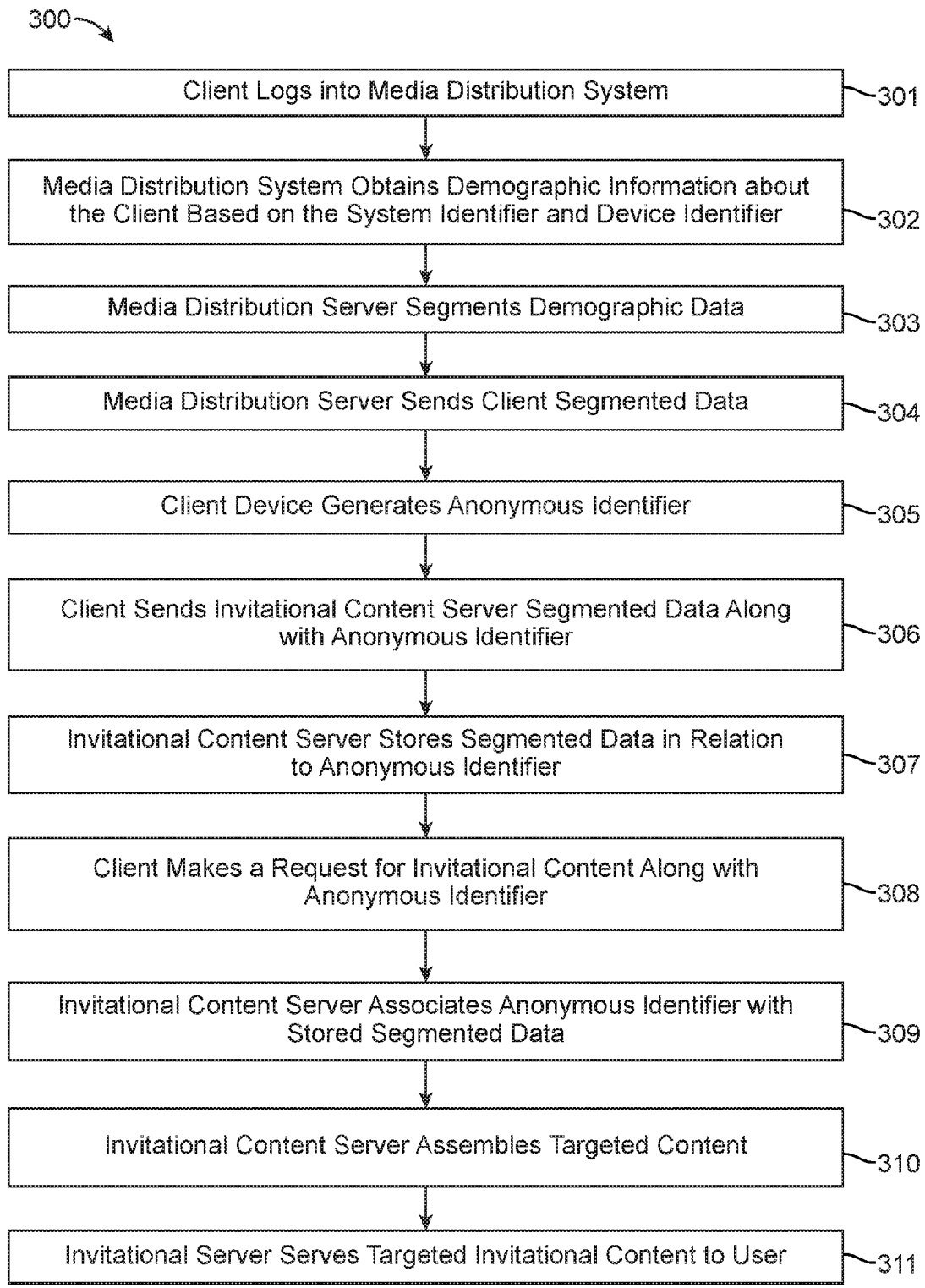
FIG. 4 illustrates an exemplary method of separating users' demographic data from a device-specific identifier according to some embodiments of the present technology.

FIG. 4 illustrates a method 300 of separating users' demographic data from a device-specific identifier according to some embodiments of the present technology. According to FIG. 4, a user specifically interacts with a media distribution system; however, it will be readily apparent to those with ordinary skill in the art having the benefit of this disclosure that the novel methods for separating users' demographic data from a device-specific identifiers extend past media distribution systems and can benefit a wide variety of system partners including, for example, application distribution systems.

The method 300 begins with a user logging in to a media distribution system 301 from a client device. In some embodiments of the present technology, the client device sends the media distribution system a user device identifier each time a user login request is made. In some embodiments of the present technology, the client device sends the media distribution system a media distribution system identifier, i.e. an account id, as well as a user device identifier each time a user login request is made. In some embodiments of the present technology, in accordance with the privacy policy, the client device automatically, periodically makes a login request to update the demographic data about the user. In some embodiments, a login request is automatically made once per day.

In response to the user login and in accordance with the privacy policy, the media distribution system uses the system identifier, the user device identifier, or both the system identifier and the user device identifier to access demographic data relating to the user 302. For example, in some embodiments of the present technology, the system identifier or the user device identifier can be used to access information about past purchases and user tastes with the media distribution system. In turn, the media distribution system can make assumptions relating to user demographics based on the past purchases and user tastes. Likewise, in some embodiments, the system identifier or the user device identifier can be used to access user location information.

Next, in accordance with the privacy policy, and as a way to make user identity more anonymous, the media distribution system repackages the user demographics into segment brackets 303. For example, a user with an age of twenty-five can be put into a [23-27] age bracket. Once the user demographic is segmented, the media distribution server sends the segmented data back to the client device 304.

As explained above, the present technology involves enforcing a policy that avoids providing device identifiers to system partners including invitational content partners or other third party partners. To achieve this end, the method 300 involves enforcing this privacy policy on the client devices by the client devices creating a uniquely generated identifier 305 to send to system partners along with segmented demographic data. In some embodiments of the present technology, a uniquely generated identifier is generated for each system partner. Additionally, in some embodiments of the present technology, the uniquely generated identifier is persistently used for subsequent contact with the system partners.

Next, the client device sends the uniquely generated identifier along with segmented demographic data to the invitational content server 306. If this data is sent along with a request for invitational content, the invitational content server can use the segmented data to better select content relevant to the user. Therefore, in some embodiments and in accordance with the privacy policy, the invitational content server stores the segmented demographic data 307 along with the uniquely generated identifier as a reference.

Next, when a user makes a request for invitational content 308, the user transfers the uniquely generated identifier along with the request, and the invitational content server looks up the segmented data 309 and assembles invitational content 310 based on the user demographics and serves the user-targeted content to the client device 311 in accordance with the privacy policy.

As an added security feature, in some embodiments of the present technology, the uniquely generated identifier is re-created upon resetting the client device. In some embodiments of the present technology, a uniquely generated identifier is created for each account identifier, thereby providing unique identifiers for each account associated with a device.

According to the method shown in FIG. 4, the client device acts as a proxy to repackage demographic data by removing a device-specific identifier in favor of a uniquely generated identifier. Accordingly, the device creates a firewall between the media distribution system and system partners, such as the invitational content server.

Figure 5:
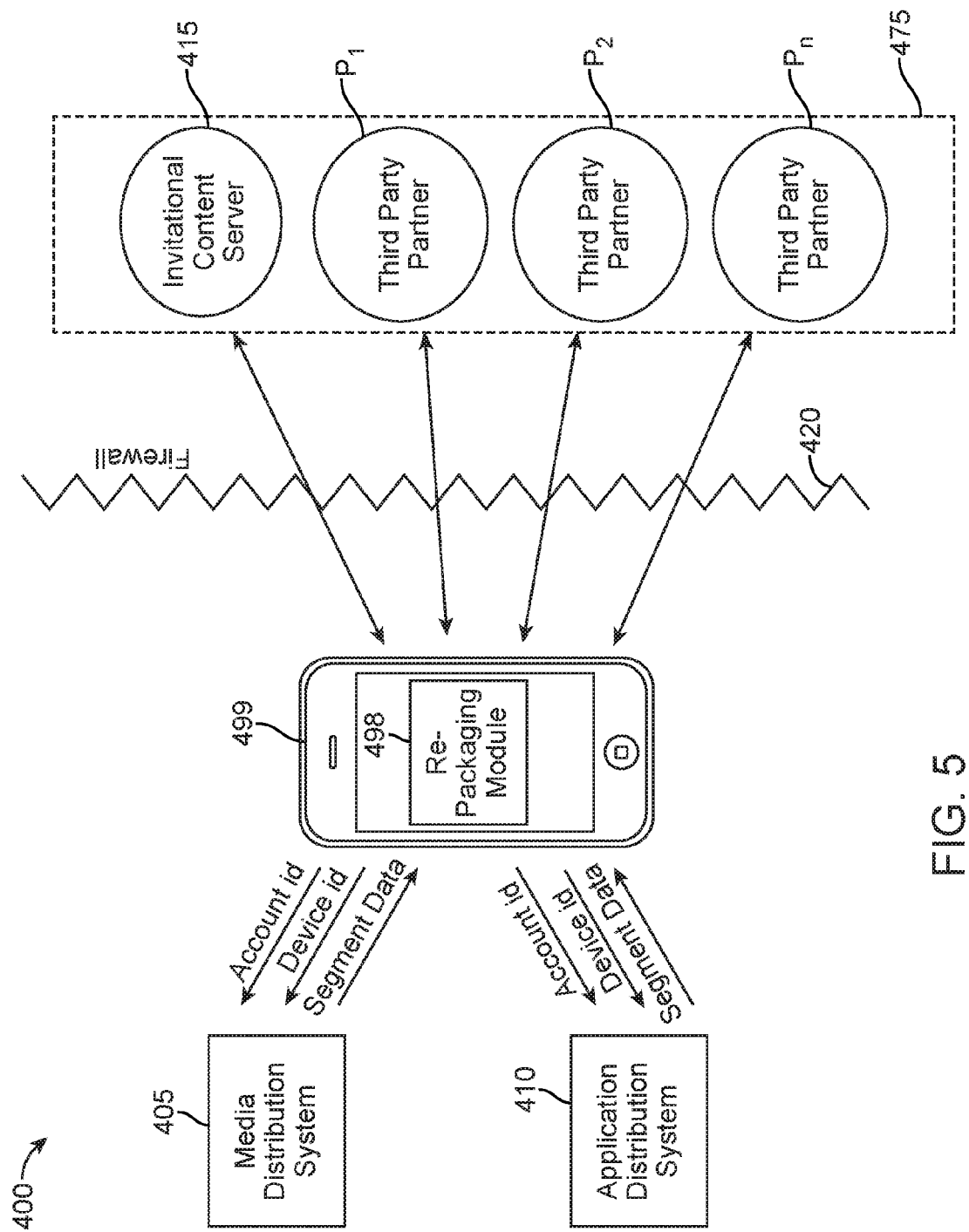
FIG. 5 illustrates an exemplary device-centric system for creating a firewall between parts of an ecosystem having access to a device-specific identifier and system partners according to some embodiments of the present technology.

FIG. 5 illustrates a device-centric system 400 for creating a firewall between parts of an ecosystem including online entities having access to a device-specific identifier and system partners 475 to whom access to the device-specific identifier is withheld according to some embodiments of the present technology.

As explained above, in some embodiments of the present technology, when a client device 499 logs into media distribution systems 405 and application distribution systems 410, the client device sends the user's account identifier and the device identifier along with the login request. Using that information, in accordance with the privacy policy, the media distribution system 405 or the application distribution system 410 finds and returns segmented demographic data back to the client device. However, according to FIG. 5, the client device 499 itself enforces a policy that avoids providing device identifiers to invitational content partners 415 or other third party partners P1, P2, . . . , Pn. To enforce this policy, some embodiments of the present technology involve a re-packaging module 498 in the client device configured for enforcing the privacy policy. More specifically, the repackaging module 498 randomly generates an identifier when the client device sends demographic data to system partners 475 an invitational content server 415 or a third party partner P1, P2, . . . , Pn. In some embodiments of the present technology, the uniquely generated identifier is persistently used in subsequent interaction with the system partners 475.

The re-packaging module 498 is also configured for repackaging the segmented data along with the uniquely generated identifier and sending out the re-packaged information. Since, the third party partners P1, P2, . . . , Pn do not gain access to the device identifier, and since neither the third party partners P1, P2, . . . , Pn nor the invitational content server 415 share common uniquely generated identifiers, the client device effectively creates a firewall 420 between itself and the distribution systems and system partners 475 in the system 400.

Figure 6:
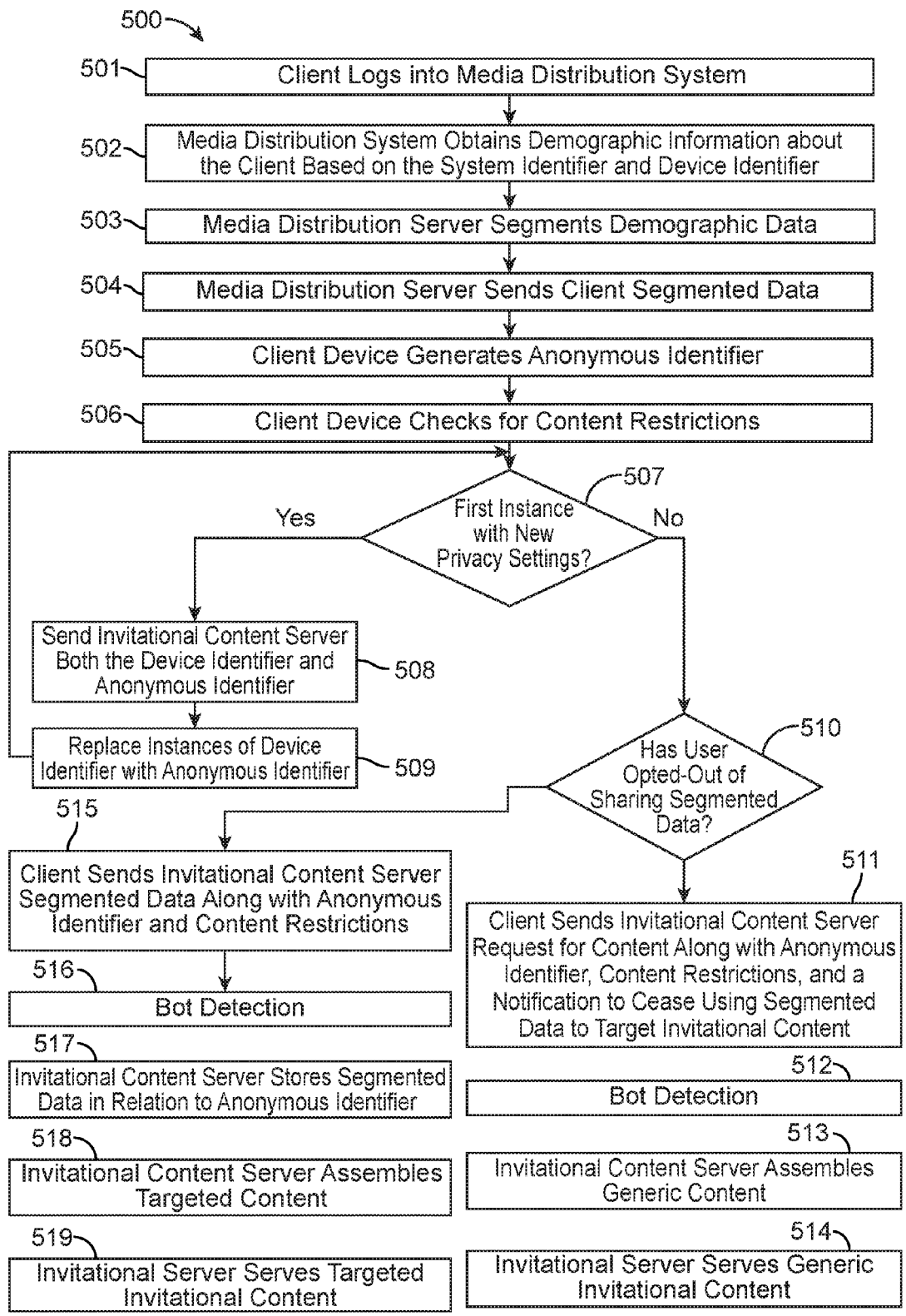
FIG. 6 illustrates an exemplary method for ensuring users' privacy according to some embodiments of the present technology.

Some embodiments of the present technology include additional features to further ensure user privacy. FIG. 6 illustrates a method 500 ensuring users' privacy according to some embodiments of the present technology.

According to FIG. 6, a user logs in to a media distribution system 501 from a client device and sends the media distribution system a media distribution system identifier, i.e. an account id, as well as a user device identifier. In response to the user login, and in accordance with the privacy policy, the media distribution system uses the system identifier and the user device identifier to access demographic data relating to the user 502. Next, the media distribution system repackages the user demographics into segment brackets 503 and the media distribution server sends the segmented data back to the client device 504. To achieve user anonymity with third party partners and an invitational content server, the client device then creates a uniquely generated identifier 505 to send to system partners along with segmented demographic data.

Some embodiments of the present technology involve enforcing user-imposed content restrictions in the invitational content server. Indeed, some users may choose to impose content restrictions on a device. For example, parents may not want their children exposed to advertisements for adult content. Accordingly, parents can impose a restriction on a child's device that does not allow content rated 17+. According to some embodiments of the present technology, these content restrictions are sent along with a request for invitational content and the content restrictions are enforced by the server not serving invitational content that is intended for a 17+ audience, i.e. advertisements for cigarettes. Accordingly, the method 500 of FIG. 6 includes checking with the client device to determine if additional content restrictions are in place 506.

Some embodiments of the present technology involve transitioning a system that previously used device identifiers to identify users in an invitational content distribution system to a system that uses only uniquely generated identifiers. More specifically, upon the user upgrading to the more private system of using a uniquely generated identifiers, the client device instructs system partner to take an additional step of purging old usages of the user's device identifier since its use is to be discontinued by the client device.

The method 500 of FIG. 6 includes a decision block 507 to determine if a client device has just upgraded to a system using uniquely generated identifiers to enforce privacy settings. According to FIG. 6, the first time a client device makes a request for invitational content with an invitational content server, the client device sends the device identifier to the invitational content server as well as a uniquely generated identifier 508. In this first instance, the invitational content server then uses the device identifier to find all records of its usage and replaces them with the uniquely generated identifier 509. In all subsequent interactions with the invitational content server, only the uniquely generated identifier is used to identify the user's demographic information. If the method 500 determines that the new privacy settings are already in place and all instances of the device identifier has been purged, the method 500 proceeds.

In some embodiments of the present technology, despite the added security from stripping demographic information from device identifiers, a user of client device can choose to opt out of sending any segmented demographic data to an invitational content server. According to these embodiments, upon the user of the client device requesting invitational content, the client device simply sends a uniquely generated identifier along with an indication that the user has opted out of the invitational content server using his segmented demographic data. Accordingly, the method 500 includes a decision block 510 to determine if the user has opted out of sharing segmented data.

If the user has opted out of sharing segmented demographic data, the client device sends the invitational content server a request for content along with a uniquely generated identifier, any applicable content restrictions, and a notification to cease from using segmented demographic data 511.

In addition to using the client device as a proxy in creating a firewall between trusted applications and system partners for whom a unique identifier is created, some embodiments of the present technology involve detecting applications designed to run automated requests for invitational content, i.e. AdBots. AdBots can be a large problem in a system for serving promotional content because they can be used to seemingly drive up the number of advertisement impressions received for a particular advertiser, thereby inflating the amount of revenue owed to the advertiser. However, since the Bots are computer programs and not actually potential customers, the advertisement impressions are meaningless. Therefore, in some embodiments of the present technology, the invitational content server uses the uniquely generated identifier as a key for the detection of Bots. For example, the invitational content server might ignore requests for invitational content in which the server does not recognize a uniquely generated identifier—assuming that the request was made by a Bot. Similarly, the invitational content server might not count such requests as impressions in an accounting. Accordingly, the method 500 of FIG. 6 includes Bot detection 512, 516.

Next, in the case in which a user has opted out of sharing segmented data, the invitational content server assembles generic invitational content 513 and serves the generic content to the user 514.

In the case where the user has not opted out of sharing segmented data, the client device sends the invitational server segmented demographic data along with the uniquely generated identifier and any content restrictions 515. Next, the invitational content server uses the uniquely generated identifier to detect Bots 516 and stores the segmented demographic data 517 along with the uniquely generated identifier as a reference. Next, the invitational content server assembles invitational content 518 based on the user demographics and serves the user-targeted content to the client device 519.

Although the invention has been described in detail with reference to particular preferred embodiments, persons possessing ordinary skill in the art to which this invention pertains will appreciate that various modifications and enhancements may be made without departing from the spirit and scope of the claims that follow.

The invention claimed is:
1. A method comprising:
sending, by a computing device to a server, a user account identifier associated with a user of the computing device and a device identifier associated with the computing device;
receiving, at the computing device from the server, demographic data associated with the user account identifier;
generating, at the computing device, a first random identifier and a second random identifier, wherein:
the first random identifier and the second random identifier are both associated with at least one of the user account identifier or the device identifier;
the first random identifier and the second random identifier are both different from both the device identifier and the user account identifier; and
the first random identifier and the second random identifier are both anonymous identifiers;
sending, by the computing device to a first entity, a portion of the demographic data along with the first random identifier, the first random identifier providing the first entity a first anonymous identity to associate with the portion of the demographic data, wherein the first anonymous identity corresponds to at least one of the user account identifier or the device identifier and does not reveal the user account identifier or the device identifier to the first entity;

sending, by the computing device to a second entity, the portion of the demographic data along with the second random identifier, the second random identifier providing the second entity a second anonymous identity to associate with the portion of the demographic data, wherein the second anonymous identity corresponds to at least one of the user account identifier or the device identifier without revealing the user account identifier or the device identifier to the second entity; and receiving, by the computing device, at least one of:
 a first media content item selected by the first entity based on the portion of the demographic data; or
 a second media content item selected by the second entity based on the portion of the demographic data.

2. The method of claim 1, wherein the demographic data comprises segmented demographic data, wherein sending the portion of the data to the first and second entities comprises sending the segmented demographic data to the first and second entities, and wherein sending the segmented demographic data to the first and second entities comprises:
 associating the segmented demographic data with the first random identifier to yield a first package of segmented data;
 associating the segmented demographic data with the second random identifier to yield a second package of segmented data; and
 sending the first package of segmented data to the first entity and the second package of segmented data to the second entity.

3. The method of claim 2, further comprising prior to sending the segmented demographic data to the first and second entities, generalizing the segmented demographic data by converting specific demographic values into a range of values.

4. The method of claim 1, wherein the server comprises a media distribution system, wherein the first entity and the second entity comprise a first provider and a second provider, and wherein the first random identifier is persistently used in subsequent interactions between the device and the first entity.

5. The method of claim 1, wherein the portion of the demographic data comprises anonymous demographic data which does not specifically identify the user, the user account identifier, or the device identifier.

6. The method of claim 1, further comprising sending user profile data to the server, the user profile data including past purchase information and user interests associated with at least one of the user account identifier or the device identifier, wherein at least part of the demographic data is inferred from the past purchase information and the user interests.

7. The method of claim 1, wherein sending the first random identifier and the portion of the demographic data comprises sending user preferences for media content.

8. The method of claim 1, wherein the first entity is associated with a first application downloaded by the computing device for obtaining a particular service associated with the first application, and wherein the second entity is associated with a second application downloaded by the computing device, the second application being different than the first application.

9. The method of claim 1, wherein the first and second random identifiers correspond to a same user account associated with the device identifier.

10. A system comprising:
 one or more processors; and
 a computer-readable storage medium having stored therein instructions which, when executed by the one or more processors, cause the one or more processors to perform operations comprising:
  sending, to a server, a user account identifier associated with a user of the system and a device identifier associated with the system;
  receiving, from the server, demographic data associated with at least one of the user account identifier or the device identifier;
  generating a first random identifier and a second random identifier, wherein:
   the first random identifier and the second random identifier are both associated with at least one of the user account identifier or the device identifier;
   the first random identifier and the second random identifier are both different from both the device identifier and the user account identifier; and
   the first random identifier and the second random identifier are both anonymous identifiers;
  sending, to a first entity, a portion of the demographic data along with the first random identifier, the first random identifier providing the first entity a first anonymous identity to associate with the portion of the demographic data, wherein the first anonymous identity:
   corresponds to at least one of the user account identifier or the device identifier; and
   does not reveal the user account identifier or the device identifier to the first entity;
  sending, to a second entity, the portion of the demographic data along with the second random identifier, the second random identifier providing the second entity a second anonymous identity to associate with the portion of the demographic data, wherein the second anonymous identity:
   corresponds to at least one of the user account identifier or the device identifier; and
   does not reveal the user account identifier or the device identifier to the second entity; and
  receiving at least one of a first media content item selected by the first entity based on the portion of the demographic data or a second media content item selected by the second entity based on the portion of the demographic data.

11. The system of claim 10, wherein the demographic data comprises segmented demographic data, wherein sending the portion of the data to the first and second entities comprises sending the segmented demographic data to the first and second entities, and wherein sending the segmented demographic data to the first and second entities comprises:
 associating the segmented demographic data with the first random identifier to yield a first package of segmented data;
 associating the segmented demographic data with the second random identifier to yield a second package of segmented data; and
 sending the first package of segmented data to the first entity and the second package of segmented data to the second entity.

12. The system of claim 10, wherein the demographic data comprises segmented demographic data, wherein the computer-readable storage medium stores additional instructions which, when executed by the one or more processors, cause the one or more processors to perform operations further comprising:

prior to sending the segmented demographic data to the first and second entities, generalizing the segmented demographic data by converting specific demographic values into a range of values.

13. The system of claim 10, wherein the computer-readable storage medium stores additional instructions which, when executed by the one or more processors, cause the one or more processors to perform operations further comprising:
sending user profile data to the server, the user profile data including past purchase information and user interests associated with at least one of the user account identifier or the device identifier, wherein at least part of the demographic data is inferred from the past purchase information and the user interests.

14. The system of claim 10, wherein the first entity is associated with a first application downloaded by the system for obtaining a particular service associated with the first application, and wherein the second entity is associated with a second application downloaded by the system, the second application being different than the first application.

15. The system of claim 10, wherein the portion of the demographic data comprises anonymous demographic data which does not specifically identify the user, the user account identifier, or the device identifier, and wherein sending the first random identifier and the portion of the demographic data comprises sending user preferences for media content.

16. A computer-readable storage device having stored therein instructions which, when executed by one or more processors, cause the one or more processors to perform operations comprising:
determining a user account identifier associated with a user, and a device identifier of a computing device associated with the user;
based on at least one of the user account identifier or the device identifier, obtaining demographic data associated with at least one of the user account identifier or the device identifier;
generating a first random identifier and a second random identifier, wherein:
the first random identifier and the second random identifier are both associated with at least one of the user account identifier or the device identifier;
the first random identifier and the second random identifier are both different from both the device identifier and the user account identifier; and
the first random identifier and the second random identifier are both anonymous identifiers;
sending, to a first entity, a portion of the demographic data along with the first random identifier, the first random identifier providing the first entity a first anonymous identity to associate with the portion of the demographic data, wherein the first anonymous identity corresponds to at least one of the user account identifier or the device identifier but does not reveal the user account identifier or the device identifier to the first entity; and
sending, to a second entity, the portion of the demographic data along with the second random identifier, the second random identifier providing the second entity a second anonymous identity to associate with the portion of the demographic data, wherein the second anonymous identity corresponds to at least one of the user account identifier or the device identifier but does not reveal the user account identifier or the device identifier to the second entity.

17. The computer-readable storage device of claim 16, wherein the demographic data comprises segmented demographic data, wherein sending the portion of the data to the first and second entities comprises sending the segmented demographic data to the first and second entities, and wherein sending the segmented demographic data to the first and second entities comprises:
associating the segmented demographic data with the first random identifier to yield a first package of segmented data;
associating the segmented demographic data with the second random identifier to yield a second package of segmented data; and
sending the first package of segmented data to the first entity and the second package of segmented data to the second entity.

18. The computer-readable storage device of claim 17, wherein the first package and the second package do not specifically identify the user, the user account identifier, or the device identifier.

19. The computer-readable storage device of claim 16, storing additional instructions which, when executed by the one or more processors, cause the one or more processors to perform operations further comprising:
receiving at least one of a first media content item selected by the first entity based on the portion of the demographic data, or a second media content item selected by the second entity based on the portion of the demographic data.

20. The computer-readable storage device of claim 16, storing additional instructions which, when executed by the one or more processors, cause the one or more processors to perform operations further comprising:
obtaining user profile data associated with at least one of the user account identifier or the device identifier, the user profile data including past purchase information and user interests, wherein at least part of the demographic data is inferred from the past purchase information and the user interests.

* * * * *